(12) United States Patent
Xing et al.

(10) Patent No.: US 11,595,964 B2
(45) Date of Patent: Feb. 28, 2023

(54) METHOD AND DEVICE FOR DETERMINING INFORMATION DOMAIN VALUE IN DCI

(71) Applicant: China Academy of Telecommunications Technology, Beijing (CN)

(72) Inventors: Yanping Xing, Beijing (CN); Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/968,607

(22) PCT Filed: Dec. 18, 2018

(86) PCT No.: PCT/CN2018/121855
§ 371 (c)(1),
(2) Date: Aug. 10, 2020

(87) PCT Pub. No.: WO2019/153896
PCT Pub. Date: Aug. 15, 2019

(65) Prior Publication Data
US 2020/0374884 A1    Nov. 26, 2020

(30) Foreign Application Priority Data
Feb. 12, 2018    (CN) .......................... 201810146788.5

(51) Int. Cl.
*H04W 72/04*    (2009.01)
*H04L 1/18*    (2006.01)
*H04W 76/27*    (2018.01)

(52) U.S. Cl.
CPC ....... *H04W 72/0493* (2013.01); *H04L 1/1819* (2013.01); *H04W 72/042* (2013.01); *H04W 72/0446* (2013.01); *H04W 76/27* (2018.02)

(58) Field of Classification Search
CPC .......... H04W 72/0493; H04W 72/042; H04W 72/0446; H04W 76/27; H04L 1/1819
(Continued)

(56) References Cited

U.S. PATENT DOCUMENTS

2015/0215079 A1    7/2015 Park
2016/0212734 A1    7/2016 He et al.
(Continued)

FOREIGN PATENT DOCUMENTS

CN    102938687 A    2/2013
CN    104955155 A    9/2015
(Continued)

OTHER PUBLICATIONS

"Remaining issues on GC-PDCCH", 3GPP TSG RAN WG1 Meeting #91, R1-1719984 (Year: 2017).*
(Continued)

*Primary Examiner* — Intekhaab A Siddiquee
(74) *Attorney, Agent, or Firm* — Kilpatrick Townsend & Stockton, LLP

(57) ABSTRACT

The present application relates to the field of communications, and disclosed are a method and device for determining an information domain value in a DCI. The method and device are used for reducing HARQ feedback overheads, and the method comprises during HARQ feedback, determining a value set indicated by a timing relationship in a fallback DCI (equivalent to a format 1_0 of a DCI) according to a value set indicated by a timing relationship in a non-fallback DCI (equivalent to a format 1-1 of a DCI), to overcome the problem of increasing a codebook caused by
(Continued)

different value ranges indicated by the timing relationships in the fallback DCI and in the non-fallback DCI, so that the HARQ feedback overheads are effectively reduced, thus the system running load is reduced, and the system performance is effectively ensured.

12 Claims, 3 Drawing Sheets

(58) Field of Classification Search
USPC .......................................................... 370/329
See application file for complete search history.

(56) References Cited

U.S. PATENT DOCUMENTS

| 2017/0288841 | A1  | 10/2017 | Park |
| 2018/0019843 | A1  | 1/2018  | Papasakellariou |
| 2018/0227156 | A1* | 8/2018  | Papasakellariou .... H04L 5/0092 |
| 2018/0367263 | A1* | 12/2018 | Ying ................. H04W 72/1273 |
| 2019/0223199 | A1* | 7/2019  | Park ...................... H04L 5/0053 |

FOREIGN PATENT DOCUMENTS

| CN | 105246164 A | 1/2016  |
| CN | 107027184 A | 8/2017  |
| CN | 107528676 A | 12/2017 |
| CN | 108024362 A | 5/2018  |

OTHER PUBLICATIONS

"DCI contents and formats in NR", 3GPP TSG RAN WGI Meeting #91, R1-1719389 (Year: 2017).*
62622732P.pdf (Year: 2018).*
R1-1717886 (Year: 2017).*
R1-1706961 (Year: 2017).*
3GPP TS 38.213 V15.0.0 (Dec. 2017) (Year: 2017).*
R1-1800947 (Year: 2018).*
R1-1719643 (Year: 2017).*
Huawei et al., "HARQ feedback timing for NR", 3GPP TSG RAN WG1 Meeting #89, Hangzhou, China, May 15-19, 2017, total 3 pages, R1-1706961.
CMCC, "Discussion on NR DCI format design", 3GPP TSG RAN WG1 Meeting #90bis, Prague, P. R. Czechia Oct. 9-13, 2017, total 3 pages, R1-1717886.
Huawei et al., "DCI contents and formats in NR", 3GPP TSG RAN WG1 Meeting #91, Reno, USA, Nov. 27-Dec. 1, 2017, total 11 pages, R1-1719389.
AT&T, "On DCI contents and formats", 3GPP TSG RAN WG1 Meeting 91, Reno, USA, Nov. 27-Dec. 1, 2017, total 9 pages, R1-1719643.
NTT DOCOMO, Inc., "Other aspects of bandwidth Parts", 3GPP TSG RAN WG1 Meeting AH 1801, Vancouver, Canada, Jan. 22-26, 2018, total 4 pages, R1-1800680.
Guangdong OPPO Mobile Telecom, "Time-domain resource allocation for NR", 3GPP TSG RAN WG1 Meeting #90, Prague, Czech Republic, Aug. 21-25, 2017, total 10 pages, R1-1713263.
Ericsson, "On UE Behavior for UGI Reporting and Other Issues", 3GPP TSG RAN WG1 Meeting AH 1801, Vancouver, Canada, Jan. 22-26, 2018, total 18 pages, R1-1800947.

* cited by examiner

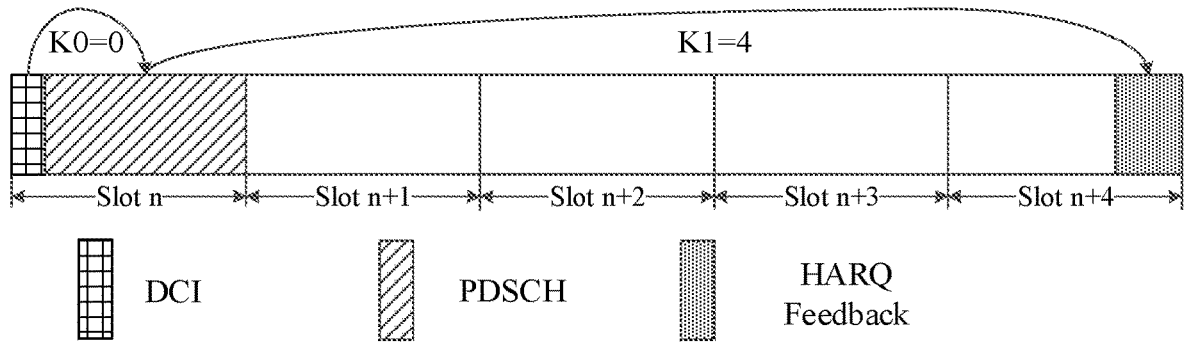

The network side configures a set of values of an information field in DCI corresponding to a first DCI format for a UE, where the set of values corresponding to the first DCI format indicates the timing relationship between a slot where a PDSCH is located and a slot where a PUCCH is located when the DCI in the first DCI format is received by the UE

210

The network side sets a current value of a target information field in the generated DCI in a second DCI format based on the DCI information field value set, after determining to send the DCI to the UE in the second DCI format

220

The network side sends the DCI in the second DCI format to the UE, and triggers the UE to perform the HARQ feedback to the network side based on the current value of the target information field in the DCI in the second DCI format

FIG. 2

METHOD AND DEVICE FOR DETERMINING INFORMATION DOMAIN VALUE IN DCI

The present application is a national phase entry under 35 U.S.C. § 371 of International Application No. PCT/CN2018/121855, filed on Dec. 18, 2018, which claims the priority from Chinese Patent Application No. 201810146788.5, filed with the China National Intellectual Property Administration on Feb. 12, 2018 and entitled "Method and Device for Determining Information field Value in DCI", which is hereby incorporated by reference in its entirety.

FIELD

The present application relates to the communication technology, and in particular to a method and device for determining a value of an information field in DCI.

BACKGROUND

In the 5G system, the New Radio (NR) supports the flexible timing relationship. For the Physical Downlink Shared Channel (PDSCH), the Downlink Control Information (DCI) carrying its scheduling information is used to indicate the timing relationship between the PDSCH and DCI as well as the timing relationship between the PDSCH and its corresponding Hybrid Automatic Repeat reQuest (HARQ) feedback.

Specifically, the DCI contains two information fields, where one is for time domain resource assignment, and the other is the PDSCH-to-HARQ_feedback timing indicator. As shown in FIG. 1, in practical applications, the field of time domain resource assignment includes the slot offset $K0$ indicating offset from the slot where the DCI is located to the slot where the PDSCH is located; while the PDSCH-to-HARQ_feedback timing indicator is used to indicate the number $K1$ of slots between the end of the PDSCH and the beginning of the HARQ feedback.

Currently, there are two formats of DCI for scheduling the PDSCH, where one is DCI format 1_0; and the other is DCI format 1_1. The DCI format 1_0 is fallback DCI, and the number of bits and the value set of each DCI information field are non-configurable for this format. DCI format 1_1 is non-fallback DCI, and the number of bits and/or the value set of each information field in the DCI is/are configurable for this format.

Taking $K1$ as an example, the value set of $K1$ supported by the DCI format 1_0 is specified in the protocol, specifically including $\{1, 2, 3, 4, 5, 6, 7, 8\}$; and the value set of $K1$ supported by the DCI format 1_1 is notified by the network side via the Radio Resource Control (RRC) signaling, specifically, at most 8 values may be selected from $\{0, 1, 2, 3, 4, 5, 6, 7, 8\}$. After setting the value set of $K1$, $K1$ carried in the DCI at each time may be selected from the corresponding value set of $K1$ for notification.

However, in the prior art, value ranges of the value set of $K1$ (hereinafter referred to as first set) used for sending the DCI in the DCI format 1_0 by the network side, and the value set of $K1$ (hereinafter referred to as second set) used for sending the DCI in the DCI format 1_1 may be different. The network side can dynamically select the DCI format 1_0 or DCI format 1_1 to send the DCI to implement the PDSCH scheduling. Then, the terminal needs to comprehensively consider the value set and the maximum value of the above first set and second set to set the size of the codebook used in the feedback process when performing the semi-static HARQ feedback in response to the PDSCH scheduling, thereby causing the unnecessary feedback overhead.

For example, it is assumed that the terminal always determines the size of the codebook used for the HARQ feedback based on the value range of the timing relationship corresponding to the DCI format 1_0. Taking $K1$ as an example, that is, it is assumed that the terminal always affirms that the value set of $K1$ is a total of 8 values: 0-7, and sets the codebook size according to 8 $K1$ values. However, it is assumed that the network side dynamically switches to use the DCI format 1_1 to send the DCI, and the currently configured value set of $K1$ is a total of 4 values: 0-3. At this time, the terminal will still determine the codebook size used for the HARQ feedback according to 8 $K1$ values. In one embodiment, this will cause the unnecessary increase in the codebook size, thus increasing the HARQ feedback overhead to a certain extent.

SUMMARY

Embodiments of the present application provide a method for determining a value of an information field in DCI, to reduce the HARQ feedback overhead.

A method for determining a value of an information field in DCI includes:

configuring a set of values for an information field in DCI corresponding to a first DCI format for a UE, where the set of values corresponding to the first DCI format indicates, a slot offset between any two of physical channels of the UE for receiving DCI in the first DCI format, to the UE; and after determining to send DCI in a second DCI format to the UE, setting a current value of a target information field in generated DCI in the second DCI format based on the set of values corresponding to the first DCI format.

In one embodiment, the UE is notified of the set of values corresponding to the first DCI format through a Radio Resource Control (RRC) message.

In one embodiment, setting a current value of a target information field in generated DCI in the second DCI format based on the set of values corresponding to the first DCI format, includes:

selecting, from the set of values corresponding to the first DCI format, a value as the current value of the target information field; or selecting a value from another set of values for an information field in DCI corresponding to the second DCI format, and taking the value as the current value of the target information field in response to determining that the value is not greater than a maximum value in the set of values corresponding to the first DCI format.

In one embodiment, after setting the current value of the target information field, the method further includes:

in a case that the set of values corresponding to the first DCI format indicates the timing relationship between the slot where the PDCCH is located and the slot where the PDSCH is located, sending the DCI in the second DCI format to the UE, and triggering the UE to receive downlink data from a network side based on the current value of the target information field in the DCI in the second DCI format;

in a case that the set of values corresponding to the first DCI format indicates the timing relationship between the slot where the PDSCH is located and the slot where the PUCCH or PUSCH is located, sending the DCI in the second DCI format to the UE, and triggering the UE to perform a Hybrid Automatic Repeat reQuest, HARQ, feedback to the network side based on the current value of the target information field in the DCI in the second DCI format.

A method for determining a value of an information field in DCI includes:

determining a set of values for an information field in DCI corresponding to a first DCI format configured by a network side, where the set of values corresponding to the first DCI format indicates a slot offset between any two of physical channels used for receiving DCI in the first DCI format;

acquiring a current value of a target information field in DCI in a second DCI format, in response to receiving the DCI in the second DCI format sent by the network side; and determining that the current value of the target information field is valid, in response to determining that the current value of the target information field is not out of a value range of the set of values corresponding to the first DCI format.

In one embodiment, the set of values corresponding to the first DCI format configured at the network side is acquired based on an RRC message.

In one embodiment, that the set of values corresponding to the first DCI format indicates a slot offset between any two of physical channels, includes:

the set of values corresponding to the first DCI format indicates a timing relationship between a slot where a PDCCH is located and a slot where a PDSCH is located; or the set of values corresponding to the first DCI format indicates a timing relationship between a slot where a PDSCH is located and a slot where a PUCCH or PUSCH is located.

In one embodiment, after determining that the current value of the target information field is valid, the method further includes:

in a case that the set of values corresponding to the first DCI format indicates the timing relationship between the slot where the PDCCH is located and the slot where the PDSCH is located, receiving downlink data from the network side based on the current value of the target information field in the DCI in the second DCI format;

in a case that the set of values corresponding to the first DCI format indicates the timing relationship between the slot where the PDSCH is located and the slot where the PUCCH or PUSCH is located, performing an HARQ feedback to the network side based on the current value of the target information field in the DCI in the second DCI format.

A device for determining a value of an information field in DCI includes:

a configuring device configured to configure a set of values for an information field in DCI corresponding to a first DCI format for a User Equipment, UE, where the set of values corresponding to the first DCI format indicates, a slot offset between any two of physical channels of the UE for receiving DCI in the first DCI format, to the UE;

a processing device configured to, after determining to send DCI in a second DCI format to the UE, set a current value of a target information field in generated DCI in the second DCI format based on the set of values corresponding to the first DCI format.

In one embodiment, the processing device notifies the UE of the set of values corresponding to the first DCI format through an RRC message.

In one embodiment, during setting the current value of the specified target information field in the generated DCI in the second DCI format based on the DCI information field value set, the processing device is configured to:

select, from the set of values corresponding to the first DCI format, a value as the current value of the target information field; or select a value from another set of values for an information field in DCI corresponding to the second DCI format, and take the value as the current value of the target information field in response to determining that the value is not greater than a maximum value in the set of values corresponding to the first DCI format.

In one embodiment, that the set of values corresponding to the first DCI format indicates, a slot offset between any two of physical channels of the UE, to the UE, includes:

the set of values corresponding to the first DCI format indicates a timing relationship between a slot where a Physical Downlink Control Channel, PDCCH, is located and a slot where a Physical Downlink Shared Channel, PDSCH, is located, to the UE, or the set of values corresponding to the first DCI format indicates a timing relationship between a slot where a PDSCH is located and a slot where a Physical Uplink Control Channel, PUCCH, or Physical Uplink Shared Channel, PUSCH, is located, to the UE.

In one embodiment, after setting the current value of the target information field, the processing device is further configured to:

in a case that the set of values corresponding to the first DCI format indicates the timing relationship between the slot where the PDCCH is located and the slot where the PDSCH is located, send the DCI in the second DCI format to the UE, and trigger the UE to receive downlink data from a network side based on the current value of the target information field in the DCI in the second DCI format;

in a case that the set of values corresponding to the first DCI format indicates the timing relationship between the slot where the PDSCH is located and the slot where the PUCCH or PUSCH is located, send the DCI in the second DCI format to the UE, and trigger the UE to perform a Hybrid Automatic Repeat reQuest, HARQ, feedback to the network side based on the current value of the target information field in the DCI in the second DCI format.

A device for determining a value of an information field in DCI includes:

a determining device configured to determine a set of values for an information field in DCI corresponding to a first DCI format configured by a network side, where the set of values corresponding to the first DCI format indicates a slot offset between any two of physical channels used for receiving DCI in the first DCI format;

a processing device configured to:
acquire a current value of a target information field in DCI in a second DCI format, in response to receiving the DCI in the second DCI format sent by the network side; and determine that the current value of the target information field is valid, in response to determining that the current value of the target information field is not out of a value range of the set of values corresponding to the first DCI format.

In one embodiment, the determining device acquires the set of values corresponding to the first DCI format configured by the network side based on an RRC message.

In one embodiment, that the set of values corresponding to the first DCI format indicates a slot offset between any two of physical channels, includes:

the set of values corresponding to the first DCI format indicates a timing relationship between a slot where a PDCCH is located and a slot where a PDSCH is located; or the set of values corresponding to the first DCI format indicates a timing relationship between a slot where a PDSCH is located and a slot where a PUCCH or PUSCH is located.

In one embodiment, after determining that the current value of the target information field is valid, the processing device is further configured to:

in a case that the set of values corresponding to the first DCI format indicates the timing relationship between the slot where the PDCCH is located and the slot where the PDSCH is located, receive downlink data from the network side based on the current value of the target information field in the DCI in the second DCI format;

in a case that the set of values corresponding to the first DCI format indicates the timing relationship between the slot where the PDSCH is located and the slot where the PUCCH or PUSCH is located, perform an HARQ feedback to the network side based on the current value of the target information field in the DCI in the second DCI format.

A network side device includes at least a processor and a transceiver, where:

the processor is configured to read programs in a memory to perform the process of:

configuring a set of values for an information field in DCI corresponding to a first DCI format for a User Equipment, UE, where the set of values corresponding to the first DCI format indicates, a slot offset between any two of physical channels of the UE for receiving DCI in the first DCI format, to the UE; and after determining to send DCI in a second DCI format to the UE, setting a current value of a target information field in generated DCI in the second DCI format based on the set of values corresponding to the first DCI format;

the transceiver is configured to receive and send data under control of the processor.

In one embodiment, the transceiver notifies the UE of the set of values corresponding to the first DCI format through an RRC message.

During setting a current value of a target information field in generated DCI in the second DCI format based on the set of values corresponding to the first DCI format, the processor is configured to:

select, from the set of values corresponding to the first DCI format, a value as the current value of the target information field; or select a value from another set of values for an information field in DCI corresponding to the second DCI format, and take the value as the current value of the target information field in response to determining that the value is not greater than a maximum value in the set of values corresponding to the first DCI format.

That the set of values corresponding to the first DCI format indicates, a slot offset between any two of physical channels of the UE, to the UE, includes:

the set of values corresponding to the first DCI format indicates a timing relationship between a slot where a Physical Downlink Control Channel, PDCCH, is located and a slot where a Physical Downlink Shared Channel, PDSCH, is located, to the UE; or the set of values corresponding to the first DCI format indicates a timing relationship between a slot where a PDSCH is located and a slot where a Physical Uplink Control Channel, PUCCH, or Physical Uplink Shared Channel, PUSCH, is located, to the UE.

In one embodiment, after setting the current value of the target information field, the processor is further configured to:

in a case that the set of values corresponding to the first DCI format indicates the timing relationship between the slot where the PDCCH is located and the slot where the PDSCH is located, send the DCI in the second DCI format to the UE, and trigger the UE to receive downlink data from a network side based on the current value of the target information field in the DCI in the second DCI format;

in a case that the set of values corresponding to the first DCI format indicates the timing relationship between the slot where the PDSCH is located and the slot where the PUCCH or PUSCH is located, send the DCI in the second DCI format to the UE, and trigger the UE to perform a Hybrid Automatic Repeat reQuest, HARQ, feedback to the network side based on the current value of the target information field in the DCI in the second DCI format.

A user equipment includes at least a processor and a transceiver, where:

the processor is configured to read programs in a memory to perform the process of:

determining a set of values for an information field in DCI corresponding to a first DCI format configured by a network side, and the set of values corresponding to the first DCI format indicates a slot offset between any two of physical channels used for receiving DCI in the first DCI format;

acquiring a current value of a target information field in DCI in a second DCI format, in response to receiving the DCI in the second DCI format sent by the network side; and determining that the current value of the target information field is valid, in response to determining that the current value of the target information field is not out of a value range of the set of values corresponding to the first DCI format;

the transceiver is configured to receive and send data under control of the processor.

In one embodiment, the processor acquires the set of values corresponding to the first DCI format configured by the network side based on an RRC message via the transceiver.

In one embodiment, that the set of values corresponding to the first DCI format indicates a slot offset between any two of physical channels, includes:

the set of values corresponding to the first DCI format indicates a timing relationship between a slot where a PDCCH is located and a slot where a PDSCH is located; or the set of values corresponding to the first DCI format indicates a timing relationship between a slot where a PDSCH is located and a slot where a PUCCH or PUSCH is located.

In one embodiment, after determining that the current value of the target information field is valid, the processor is further configured to:

in a case that the set of values corresponding to the first DCI format indicates the timing relationship between the slot where the PDCCH is located and the slot where the PDSCH is located, receive downlink data from the network side based on the current value of the target information field in the DCI in the second DCI format;

in a case that the set of values corresponding to the first DCI format indicates the timing relationship between the slot where the PDSCH is located and the slot where the PUCCH or PUSCH is located, perform an HARQ feedback to the network side based on the current value of the target information field in the DCI in the second DCI format.

A storage medium storing a program for determining a value of an information field in DCI, where the program, when being executed by the processor, performs the steps of:

configuring a set of values for an information field in DCI corresponding to a first DCI format for a User Equipment, UE, where the set of values corresponding to the first DCI format indicates, a slot offset between any two of physical channels of the UE for receiving DCI in the first DCI format, to the UE; and after determining to send DCI in a second DCI format to the UE, setting a current value of a target information field in generated DCI in the second DCI format based on the set of values corresponding to the first DCI format.

A storage medium storing a program for determining a value of an information field in DCI, where the program, when being executed by the processor, performs the steps of:

determining a set of values for an information field in DCI corresponding to a first DCI format configured by a network side, where the set of values corresponding to the first DCI format indicates a slot offset between any two of physical channels used for receiving DCI in the first DCI format;

acquiring a current value of a target information field in DCI in a second DCI format, in response to receiving the DCI in the second DCI format sent by the network side; and determining that the current value of the target information field is valid, in response to determining that the current value of the target information field is not out of a value range of the set of values corresponding to the first DCI format.

In the embodiments of the present application, after setting the set of values for an information field in DCI corresponding to the first DCI format, when sending DCI to the terminal in the second DCI format, the network side selects the corresponding information field value based on the set of values corresponding to the first DCI format. Correspondingly, after acquiring the set of values corresponding to the first DCI, when receiving the DCI sent based on the second DCI format, the terminal may perform the HARQ feedback only when determining that the information field value therein is not out of range of the information field value information corresponding to the first DCI. In short, the embodiments of the present application propose that the set of values for indicating the timing relationship in the fallback DCI (that is, DCI format 1_0) is determined according to the set of values for indicating the timing relationship configured in the non-fallback DCI (DCI format 1_1), to overcome the problem of increasing the size of the codebook caused by the different value ranges of the sets for indicating the timing relationships in the fallback DCI and non-fallback DCI, effectively reduce the HARQ feedback overhead, then reduce the system operating load, and effectively ensure the system performance.

BRIEF DESCRIPTION OF THE DRAWINGS

FIG. 1 is a schematic diagram of the timing relationship between various information fields in DCI in an embodiment of the present application;

FIG. 2 is a schematic flowchart of determining the information field value in the DCI at the network side in an embodiment of the present application;

DETAILED DESCRIPTION OF THE EMBODIMENTS

Figure 3:
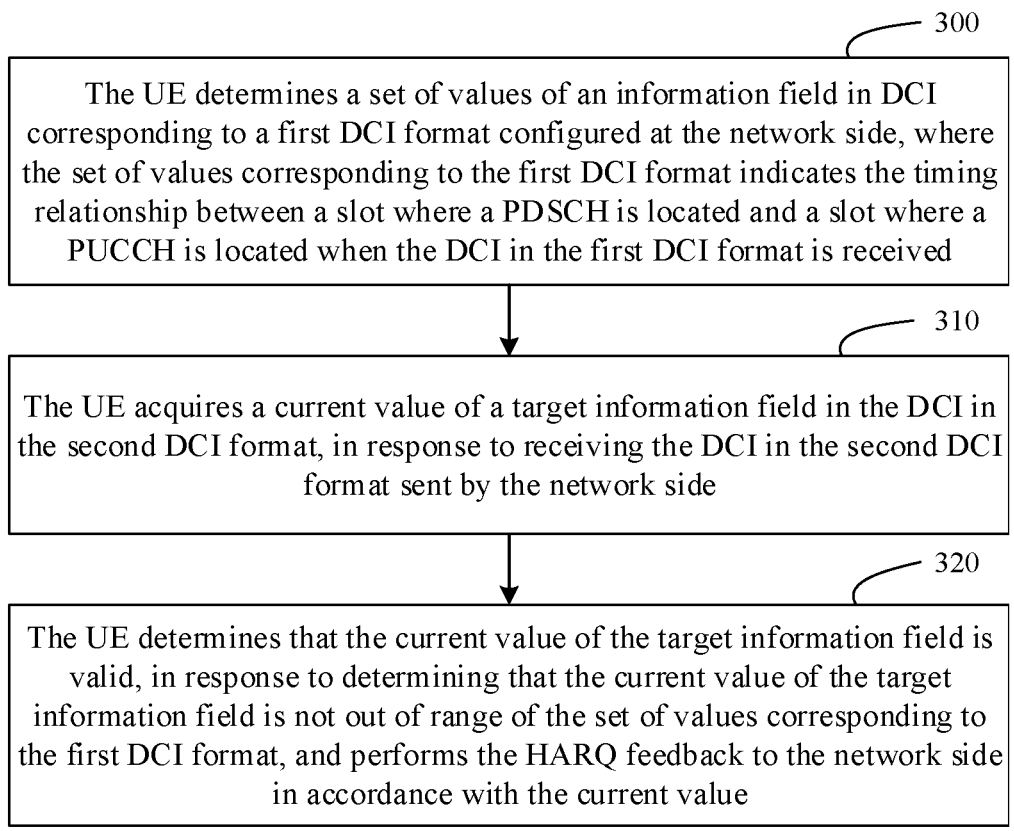
FIG. 3 is a schematic flowchart of determining the information field value in the DCI by a UE in an embodiment of the present application.

In order to reduce the HARQ feedback overhead, in the embodiments of the present application, when the network side uses the first DCI format and the second DCI format to send the DCI, the same set of values for the information field is shared. Accordingly, for the DCI in the first DCI format and the DCI in the second DCI format, the terminal uses the same set of values to perform the HARQ feedback.

The embodiments of the present application will be illustrated below in details in combination with the drawings.

In an embodiment of the present application, the network side configures a set of values for an information field in DCI corresponding to a first DCI format for a UE, where the set of values corresponding to the first DCI format indicates, a slot offset between any two of physical channels used by the UE when the DCI in the first DCI format is received to the UE; and then the network side sets a current value of a target information field in the generated DCI in a second DCI format based on the set of values after determining to send the DCI to the UE in the second DCI format.

Here, the set of values for the information field in DCI is used to indicate the slot offset between any two of physical channels used by the UE when the DCI in the first DCI format is received to the UE, which usually includes but not limited to the following two cases.

First case: the set of values for the information field in DCI corresponding to the first DCI format indicates to the UE the timing relationship between a slot where a PDCCH is located and a slot where a PDSCH is located when the DCI in the first DCI format is received.

In short, the network side can set the set of values of the time domain resource assignment (that is, K0) included in the DCI format 1_1 through the set of values for the information field in DCI.

In this way, when sending the DCI in the DCI format 1_0, the network side can refer to the set of values for the information field in DCI to set the current value of K0. Correspondingly, after receiving the DCI in the DCI format 1_0, the UE can receive the downlink data on the PDSCH in accordance with the value of K0.

Second case: the set of values for the information field in DCI indicates the timing relationship between a slot where a PDSCH is located and a slot where a PUCCH or PUSCH is located when the DCI in the first DCI format is received to the UE.

In short, the network side can set the set of values of the PDSCH-to-HARQ_feedback timing indicator (that is, K1) contained in the DCI format 1_1 through the set of values for the information field in DCI.

In this way, when sending the DCI in the DCI format 1_0, the network side can refer to the set of values for the information field in DCI to set the current value of K1. Correspondingly, after receiving the DCI in the DCI format 1_0, the UE can perform the HARQ feedback on the PUCCH or PUSCH in accordance with the value of K1.

Referring to FIG. 2, in the subsequent embodiments, for convenience of description, taking K1 as an example, the detailed process of determining the value of an information field in the DCI at the network side is introduced as follows.

Step 200: the network side configures a set of values for the information field in DCI corresponding to a first DCI format for a UE, where the set of values for the information field in DCI indicates the timing relationship between a slot where a PDSCH is located and a slot where a PUCCH or PUSCH is located (i.e., the timing relationship between the PDSCH and HASQ feedback) when the DCI in the first DCI format is received, to the UE.

For example, it is assumed that the network side configures the following content for UE1 through an RRC message: the set of values of "PDSCH to HARQ feedback timing indicator" in the DCI in the DCI format 1_1 is {1, 2, 3, 4}.

For another example, it is assumed that the network side configures the following content for UE2 through an RRC message: the set of values of "PDSCH to HARQ feedback timing indicator" in the DCI format 1_1 is {1, 2, 3, 4, 5, 6}.

In practical applications, the value of an information field is configured in accordance with the protocol provision for the DCI in the DCI format 1_0, while the value of an information field may be dynamically configured by the network side for the DCI in the DCI format 1_1. Therefore, in the embodiments of the present application, the DCI in the DCI format 1_1 is also referred to as the DCI in the first DCI format, and the DCI in the DCI format 1_0 is also referred to as the DCI in the second DCI format. At the same time, in the pre-processing stage, the network side notifies the UE of the set of values for the information field in DCI in the DCI format 1_1 through the RRC message. When using the DCI in the DCI format 1_0 later, the network side can refer to the set of values configured for the DCI in the DCI format 1_1 to configure the current value of the "PDSCH to HARQ feedback timing indicator" in the DCI in the DCI format 1_0.

Step 210: the network side sets a current value of a target information field in the generated DCI in a second DCI format based on the set of values for the information field in DCI when determining to send the DCI to the UE in the second DCI format.

Specifically, when the step 210 is performed, it is possible to use but not limited to the following two ways.

The first way is: selecting a value from the set of values corresponding to the first DCI format as the current value of the target information field in the DCI in the second DCI format.

For example, assuming that the network side uses the DCI in the DCI format 1_0 to schedule the UE1, then the value range of the "PDSCH to HARQ feedback timing indicator" in the DCI format 1_0 is determined based on the set (i.e., {1, 2, 3, 4}) of the "PDSCH to HARQ feedback timing indicator" in the DCI in the DCI format 1_1 configured for the UE1, and the network side will select a value to configure the "PDSCH to HARQ feedback timing indicator" in the DCI format 1_0, that is, the network side avoids from setting the "PDSCH to HARQ feedback timing indicator" in the DCI in the DCI format 1_0 for the UE1 as one of 5, 6, 7 and 8.

For another example, assuming that the network side uses the DCI in the DCI format 1_0 to schedule the UE2, then the value range of the "PDSCH to HARQ feedback timing indicator" in the DCI format 1_0 is determined based on the set (i.e., {1, 2, 3, 4, 5, 6}) of the "PDSCH to HARQ feedback timing indicator" in the DCI in the DCI format 1_1 configured for the UE2, and the network side will select a value to configure the "PDSCH to HARQ feedback timing indicator" in the DCI format 1_0, that is, the network side avoids from setting the "PDSCH to HARQ feedback timing indicator" in the DCI in the DCI format 1_0 for the UE2 as one of 7 and 8.

The second way is: selecting a value from set of values for an information field in DCI corresponding to the second DCI format, and taking the value as the current value of the target information field when determining that the value is not greater than the maximum value in the set of values corresponding to the first DCI format.

For example, assuming that the network side uses the DCI in the DCI format 1_0 to schedule the UE1, then referring to the set (i.e., {1, 2, 3, 4}) of the "PDSCH to HARQ feedback timing indicator" in the DCI in the DCI format 1_1 configured for the UE1, the network side selects a value (such as 4) from another set {1, 2, 3, 4, 5, 6, 7, 8} corresponding to the DCI format 1_0 configured according to the protocol provision, and uses this value to configure the "PDSCH to HARQ feedback timing indicator" in the DCI format 1_0 when determining that the selected value is not greater than the maximum value in {1, 2, 3, 4}, that is, the network side avoids from setting the "PDSCH to HARQ feedback timing indicator" in the DCI in the DCI format 1_0 for the UE1 as one of 5, 6, 7 and 8.

For another example, assuming that the network side uses the DCI in the DCI format 1_0 to schedule the UE2, then referring to the value set (i.e., {1, 2, 3, 4, 5, 6}) of the "PDSCH to HARQ feedback timing indicator" in the DCI in the DCI format 1_1 configured for the UE2, the network side selects a value (such as 5) from another set {1, 2, 3, 4, 5, 6, 7, 8} corresponding to the DCI format 1_0 configured according to the protocol provision, and uses this value to configure the "PDSCH to HARQ feedback timing indicator" in the DCI format 1_0 when determining that the selected value is not greater than the maximum value in {1, 2, 3, 4, 5, 6}, that is, the network side avoids from setting the "PDSCH to HARQ feedback timing indicator" in the DCI in the DCI format 1_0 for the UE2 as one of 7 and 8.

Step 220: the network side sends the DCI in the second DCI format to the UE, and triggers the UE to perform the HARQ feedback to the network side based on the current value of the target information field in the DCI in the second DCI format.

The network side may send the generated DCI in the DCI format 1_0 to the UE and trigger the UE to perform the HARQ feedback to the network side based on the current value of the "PDSCH to HARQ feedback timing indicator".

Based on the above embodiments, referring to FIG. 3, in an embodiment of the present application, K1 is still taken as an example to introduce the detailed process of determining the information field value in DCI by a UE as follows.

Step 300: the UE determines a set of values of an information field in DCI in a first DCI format at the network side, where the set of values indicates the timing relationship between a slot where a PDSCH is located and a slot where a PUCCH or PUSCH is located when the DCI in the first DCI format is received.

For example, it is assumed that the UE obtains the following content configured by the network side for the UE1 through the RRC message: the set of values of "PDSCH to HARQ feedback timing indicator" in the DCI in the DCI format 1_1 is {1, 2, 3, 4}.

For another example, it is assumed that the UE acquires the following content configured by the network side for the UE2 through the RRC message: the set of values of "PDSCH to HARQ feedback timing indicator" in the DCI format 1_1 is {1, 2, 3, 4, 5, 6}.

Step 310: the UE acquires a current value of a target information field in the DCI in the second DCI format, in response to receiving the DCI in the second DCI format sent by the network side.

Specifically, the UE acquires the current value of the "PDSCH to HARQ feedback timing indicator" (i.e., the target information field), in response to receiving the DCI in the DCI format 1_0 sent by the network side.

For example, it is assumed that the current value of the "PDSCH to HARQ feedback timing indicator" acquired by the UE1 is 3.

For another example, it is assumed that the current value of the "PDSCH to HARQ feedback timing indicator" acquired by the UE2 is 8.

Step 320: the UE determines that the current value of the target information field is valid in response to determining that the current value of the target information field is not out of the value range of the set of values, and performs the HARQ feedback to the network side in accordance with the current value.

Further, in response to determining that the current value of the target information field is out of the value range of the set of values, the UE takes the current value of the target information field as an invalid value and does not perform the HARQ feedback.

For example, since the current value of the "PDSCH to HARQ feedback timing indicator" acquired by the UE1 is 3, which is not out of range of the set {1, 2, 3, 4} of the "PDSCH to HARQ feedback timing indicator" in the DCI in the DCI format 1_1 set for the UE1, the UE1 will perform the HARQ feedback on the corresponding slot after that for the PDSCH according to the timing relationship indicated by "3".

For another example, since the current value of the "PDSCH to HARQ feedback timing indicator" acquired by the UE2 is 8 which is out of range of the set {1, 2, 3, 4, 5, 6} of the "PDSCH to HARQ feedback timing indicator" in the DCI format 1_1 set for the UE2, the UE2 will consider "8" as an invalid value and ignore this PDSCH scheduling or not perform the HARQ feedback for this PDSCH scheduling.

The above embodiments are all introduced by taking the set of values of K1 corresponding to the DCI in the DCI format 1_1 as an example. In practical applications, they are also applicable to the application scenario where the set of values of K0 is set corresponding to the DCI in the DCI format 1_1. In this scenario, the network side may set the set of values of K0 corresponding to the DCI in the DCI format 1_1, that is, set the slot offset between the slot where the PDCCH is located and the slot where the PDSCH is located. Then, the network side may set the current value of the time domain resource assignment (i.e., K0) in the DCI according to the above set of values when sending the DCI in the DCI format 1_0 to the UE, and the UE may receive the downlink data sent from the network side on the corresponding PDSCH according to the current value of K0 indicated in the received DCI in the DCI format 1_0. The specific process is the same as the process of setting and applying K1, and will not be repeated here.

Figure 4:
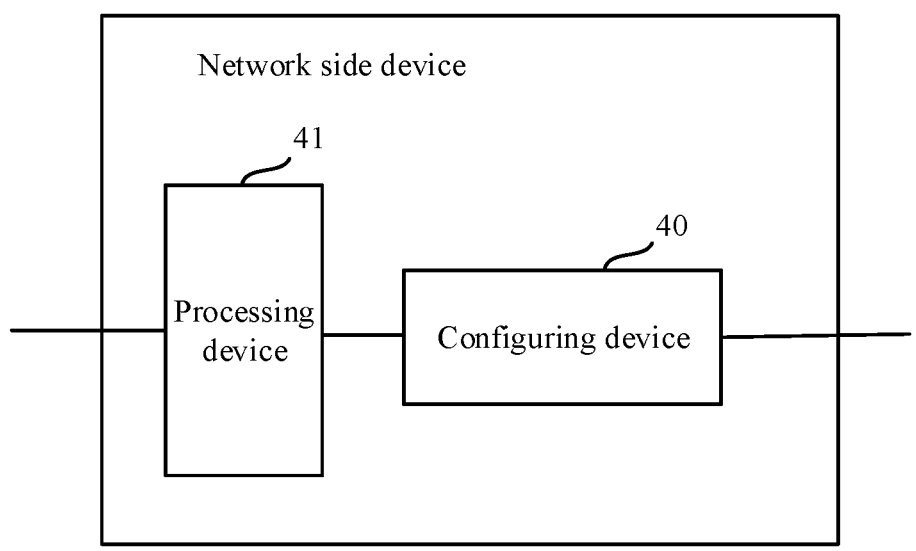
FIG. 4 is a schematic diagram of a logical function structure of a network side apparatus in an embodiment of the present application.

Based on the foregoing embodiments, as shown in FIG. 4, in an embodiment of the present application, a device for determining a value of an information field in DCI (e.g., network side device) includes at least a configuring device 40 and a processing device 41;

the configuring device 40 is configured to configure a set of values for an information field in DCI corresponding to a first DCI format for a User Equipment, UE, where the set of values corresponding to the first DCI format indicates, a slot offset between any two of physical channels of the UE for receiving DCI in the first DCI format, to the UE;

the processing device 41 is configured to, after determining to send DCI in a second DCI format to the UE, set a current value of a target information field in generated DCI in the second DCI format based on the set of values corresponding to the first DCI format.

In one embodiment, the processing device 41 notifies the UE of the set of values corresponding to the first DCI format corresponding to the first DCI format through an RRC message.

In one embodiment, during setting a current value of a target information field in generated DCI in the second DCI format based on the set of values corresponding to the first DCI format, the processing device 41 is configured to:

select, from the set of values corresponding to the first DCI format, a value as the current value of the target information field; or select a value from another set of values for an information field in DCI corresponding to the second DCI format, and take the value as the current value of the target information field in response to determining that the value is not greater than a maximum value in the set of values corresponding to the first DCI format.

In one embodiment, that the set of values corresponding to the first DCI format indicates, a slot offset between any two of physical channels of the UE, to the UE, includes:

the set of values corresponding to the first DCI format indicates a timing relationship between a slot where a Physical Downlink Control Channel, PDCCH, is located and a slot where a Physical Downlink Shared Channel, PDSCH, is located, to the UE; or the set of values corresponding to the first DCI format indicates a timing relationship between a slot where a PDSCH is located and a slot where a Physical Uplink Control Channel, PUCCH, or Physical Uplink Shared Channel, PUSCH, is located, to the UE.

In one embodiment, after setting the current value of the target information field, the processing device 41 is further configured to:

in a case that the set of values corresponding to the first DCI format indicates the timing relationship between the slot where the PDCCH is located and the slot where the PDSCH is located, send the DCI in the second DCI format to the UE, and trigger the UE to receive downlink data from a network side based on the current value of the target information field in the DCI in the second DCI format;

in a case that the set of values corresponding to the first DCI format indicates the timing relationship between the slot where the PDSCH is located and the slot where the PUCCH or PUSCH is located, send the DCI in the second DCI format to the UE, and trigger the UE to perform a Hybrid Automatic Repeat reQuest, HARQ, feedback to the network side based on the current value of the target information field in the DCI in the second DCI format.

Figure 5:
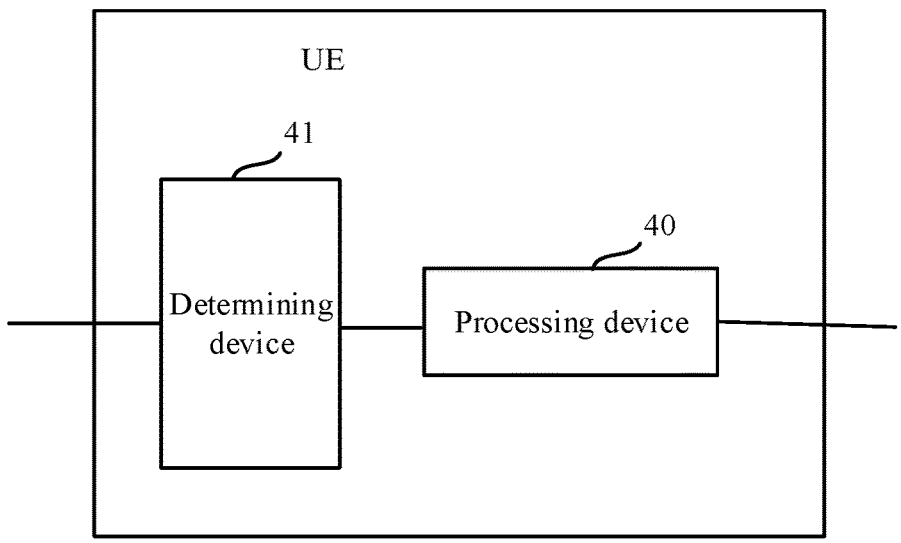
FIG. 5 is a schematic diagram of a logical function structure of a user equipment in an embodiment of the present application.

Referring to FIG. 5, in an embodiment of the present application, a device (e.g., UE) for determining a value of an information field in DCI includes at least a determining device 50 and a processing device 51, where:

the determining device 50 is configured to a set of values for an information field in DCI corresponding to a first DCI format configured by a network side, where the set of values corresponding to the first DCI format indicates a slot offset between any two of physical channels used for receiving DCI in the first DCI format;

the processing device 51 is configured to;

acquire a current value of a target information field in DCI in a second DCI format, in response to receiving the DCI in the second DCI format sent by the network side; and determine that the current value of the target information field is valid, in response to determining that the current value of the target information field is not out of a value range of the set of values corresponding to the first DCI format.

In one embodiment, the determining device 50 acquires the set of values corresponding to the first DCI format configured at the network side based on an RRC message.

In one embodiment, the set of values corresponding to the first DCI format indicates a slot offset between any two of physical channels, includes:

the set of values corresponding to the first DCI format indicates a timing relationship between a slot where a PDCCH is located and a slot where a PDSCH is located; or the set of values corresponding to the first DCI format indicates a timing relationship between a slot where a PDSCH is located and a slot where a PUCCH or PUSCH is located.

In one embodiment, after determining that the current value of the target information field is valid, the processing device 51 is further configured to:

in a case that the set of values corresponding to the first DCI format indicates the timing relationship between the slot where the PDCCH is located and the slot where the PDSCH is located, receive downlink data from the network side based on the current value of the target information field in the DCI in the second DCI format;

in a case that the set of values corresponding to the first DCI format indicates the timing relationship between the slot where the PDSCH is located and the slot where the PUCCH or PUSCH is located, perform an HARQ feedback to the network side based on the current value of the target information field in the DCI in the second DCI format.

Figure 6:
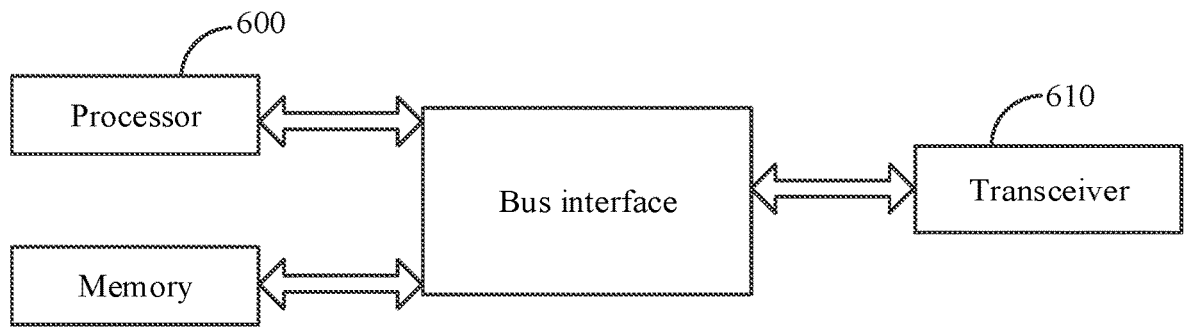
FIG. 6 is a schematic diagram of an entity functional structure of a network side device in an embodiment of the present application.

Referring to FIG. 6, based on the same inventive concept, an embodiment of the present application provides a network side device, including at least a processor 600 and a transceiver 610, where:

the processor 600 is configured to read the programs in a memory to perform the process of:

configuring a set of values for an information field in DCI corresponding to a first DCI format for a User Equipment, UE, where the set of values corresponding to the first DCI format indicates, a slot offset between any two of physical channels of the UE for receiving DCI in the first DCI format, to the UE; and after determining to send DCI in a second DCI format to the UE, setting a current value of a target information field in generated DCI in the second DCI format based on the set of values corresponding to the first DCI format;

the transceiver 610 is configured to receive and send data under control of the processor.

Here, in FIG. 6, the bus architecture may include any numbers of interconnected buses and bridges, and specifically link various circuits of one or more processors represented by the processor 600 and the memory represented by the memory. The bus architecture may further link various other circuits such as peripheral device, voltage regulator and power management circuit, which are all well known in the art and thus will not be further described again herein. The bus interface provides an interface. The transceiver 610 can be a plurality of elements, i.e., include a transmitter and a receiver, and provide the devices for communicating with various other devices over the transmission media. The processor 600 is responsible for managing the bus architecture and general processing, and the memory may store the data used by the processor 600 when performing the operations.

In one embodiment, the transceiver 610 notifies the UE of the set of values corresponding to the first DCI format through an RRC message.

During setting a current value of a target information field in generated DCI in the second DCI format based on the set of values corresponding to the first DCI format, the processor 600 is configured to:

select, from the set of values corresponding to the first DCI format, a value as the current value of the target information field; or select a value from another set of values for an information field in DCI corresponding to the second DCI format, and take the value as the current value of the target information field in response to determining that the value is not greater than a maximum value in the set of values corresponding to the first DCI format.

That the set of values corresponding to the first DCI format indicates, a slot offset between any two of physical channels of the UE, to the UE, refers to that:

the set of values corresponding to the first DCI format indicates a timing relationship between a slot where a Physical Downlink Control Channel, PDCCH, is located and a slot where a Physical Downlink Shared Channel, PDSCH, is located, to the UE; or the set of values corresponding to the first DCI format indicates a timing relationship between a slot where a PDSCH is located and a slot where a Physical Uplink Control Channel, PUCCH, or Physical Uplink Shared Channel, PUSCH, is located, to the UE.

In one embodiment, after setting the current value of the target information field, the processor 600 is further configured to:

in a case that the set of values corresponding to the first DCI format indicates the timing relationship between the slot where the PDCCH is located and the slot where the PDSCH is located, send the DCI in the second DCI format to the UE, and trigger the UE to receive downlink data from a network side based on the current value of the target information field in the DCI in the second DCI format;

in a case that the set of values corresponding to the first DCI format indicates the timing relationship between the slot where the PDSCH is located and the slot where the PUCCH or PUSCH is located, send the DCI in the second DCI format to the UE, and trigger the UE to perform a Hybrid Automatic Repeat reQuest, HARQ, feedback to the network side based on the current value of the target information field in the DCI in the second DCI format.

Figure 7:
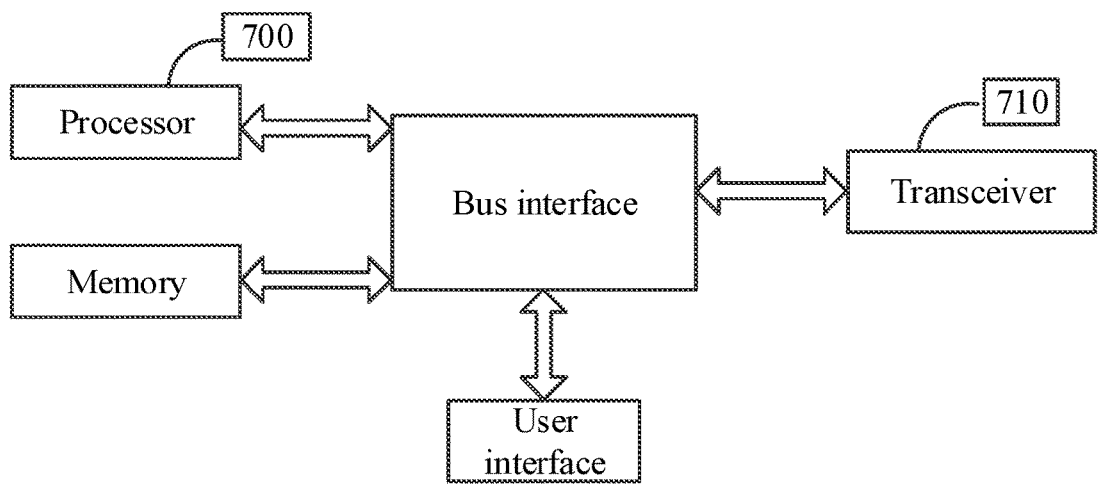
FIG. 7 is a schematic diagram of an entity functional structure of a user equipment in an embodiment of the present application.

Referring to FIG. 7, based on the same inventive concept, an embodiment of the present application provides a user equipment, including at least a processor 700 and a transceiver 710, where:

the processor 700 is configured to read the programs in a memory to perform the process of:

determining a set of values for an information field in DCI corresponding to a first DCI format configured by a network side, and the set of values corresponding to the first DCI format indicates a slot offset between any two of physical channels used for receiving DCI in the first DCI format;

acquiring a current value of a target information field in DCI in a second DCI format, in response to receiving the DCI in the second DCI format sent by the network side; and determining that the current value of the target information field is valid, in response to determining that the current value of the target information field is not out of a value range of the set of values corresponding to the first DCI format;

the transceiver 710 is configured to receive and send data under control of the processor.

Here, in FIG. 7, the bus architecture can include any numbers of interconnected buses and bridges, and specifically link various circuits of one or more processors represented by the processor 700 and the memory represented by the memory. The bus architecture may further link various other circuits such as peripheral device, voltage regulator and power management circuit, which are all well known in the art and thus will not be further described again herein. The bus interface provides an interface. The transceiver 710 can be a plurality of elements, i.e., include a transmitter and a receiver, and provide the devices for communicating with various other devices over the transmission media. For different UEs, the user interface can also be the interface for inter-connecting or external-connecting with the required devices, and the connected devices include but not limited to keypad, display, loudspeaker, microphone, joystick and the like.

The processor 700 is responsible for managing the bus architecture and general processing, and the memory may store the data used by the processor 700 when performing the operations.

In one embodiment, the processor 700 acquires the set of values corresponding to the first DCI format configured at the network side based on an RRC message via the transceiver.

In one embodiment, that the set of values corresponding to the first DCI format indicates a slot offset between any two of physical channels, includes:

the set of values corresponding to the first DCI format indicates a timing relationship between a slot where a PDCCH is located and a slot where a PDSCH is located; or the set of values corresponding to the first DCI format indicates a timing relationship between a slot where a PDSCH is located and a slot where a PUCCH or PUSCH is located.

In one embodiment, after determining that the current value of the target information field is valid, the processor 700 is further configured to:

in a case that the set of values corresponding to the first DCI format indicates the timing relationship between the slot where the PDCCH is located and the slot where the PDSCH is located, receive downlink data from the network side based on the current value of the target information field in the DCI in the second DCI format;

in a case that the set of values corresponding to the first DCI format indicates the timing relationship between the slot where the PDSCH is located and the slot where the PUCCH or PUSCH is located, perform an HARQ feedback to the network side based on the current value of the target information field in the DCI in the second DCI format.

Based on the same inventive concept, a storage medium is provided, which stores a program for determining a value of an information field in DCI, where the program, when being executed by the processor, performs the steps of:

configuring a set of values for an information field in DCI corresponding to a first DCI format for a User Equipment, UE, and the set of values corresponding to the first DCI format indicates, a slot offset between any two of physical channels of the UE for receiving DCI in the first DCI format, to the UE; and after determining to send DCI in a second DCI format to the UE, setting a current value of a target information field in generated DCI in the second DCI format based on the set of values corresponding to the first DCI format.

Based on the same inventive concept, a storage medium is provided, which stores a program for determining a value of an information field in DCI, where the program, when being executed by the processor, performs the steps of:

determining a set of values for an information field in DCI corresponding to a first DCI format configured by a network side, and the set of values corresponding to the first DCI format indicates a slot offset between any two of physical channels used for receiving DCI in the first DCI format;

acquiring a current value of a target information field in DCI in a second DCI format, in response to receiving the DCI in the second DCI format sent by the network side; and determining that the current value of the target information field is valid, in response to determining that the current value of the target information field is not out of a value range of the set of values corresponding to the first DCI format.

In summary, in the embodiments of the present application, after setting the set of values of the information field in DCI in the first DCI format, when sending the DCI in the second DCI format to the terminal, the network side selects a corresponding value based on the set of values corresponding to the first DCI format. Correspondingly, after acquiring the set of values corresponding to the first DCI, when receiving the DCI sent based on the second DCI format, the terminal may perform the HARQ feedback only in response to determining that the value of information field therein is not out range of the set of values corresponding to the first DCI. In short, the embodiments of the present application propose that the set of values for indicating the timing relationship in the fallback DCI (that is, DCI format 1_0) is determined according to the set of values for indicating the timing relationship configured in the non-fallback DCI (DCI format 1_1), to overcome the problem of increasing a size of the codebook caused by the different value ranges of the sets for indicating the timing relationships in the fallback DCI and non-fallback DCI, effectively reduce the HARQ feedback overhead, then reduce the system operating load, and effectively ensure the system performance.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for determining a value of a target information field in Downlink Control Information, DCI, applied to a network side device, wherein the target information field indicates a slot offset between a Physical Downlink Shared Channel, PDSCH, and corresponding Hybrid Automatic Repeat request, HARQ, feedback used by a User Equipment, UE, and the method comprises:
    notifying, through a Radio Resource Control, RRC, message, the UE of a set of values for the slot offset indicated by the target information field in DCI corresponding to only a first DCI format, wherein the set of values corresponding to only the first DCI format comprises one value or more than one values, while another set of values for the slot offset indicated by the target information field in DCI corresponding to a second DCI format is specified by a protocol and comprises a plurality of values; and
    after determining to send DCI in the second DCI format to the UE, setting a current value of the slot offset indicated by the target information field in the DCI with the second DCI format to be equal to one of the values of the set of values corresponding to only the first DCI format;
    wherein the first DCI format is a non-fallback DCI format and the second DCI format is a fallback DCI format.

2. The method according to claim 1, wherein the setting a current value of the slot offset indicated by the target information field in the DCI with the second DCI format based on the set of values corresponding to only the first DCI format comprises:
    selecting, from the set of values corresponding to only the first DCI format, a value as the current value of the slot offset indicated by the target information field in the DCI with the second DCI format.

3. The method according to claim 1, wherein, after setting the current value of the slot offset indicated by the target information field in the DCI with the second DCI format, the method further comprises:
    sending the DCI in the second DCI format to the UE, and triggering the UE to perform the HARQ feedback to the network side based on the current value of the slot offset indicated by the target information field in the DCI with the second DCI format.

4. The method according to claim 1, wherein the fallback DCI format is DCI format 1_0, and the non-fallback DCI format is a DCI format used for scheduling PDSCH, other than the DCI format 1_0.

5. The method according to claim 4, wherein the non-fallback DCI format is a DCI format 1_1.

6. A method for determining a value of a target information field in Downlink Control Information, DCI, applied to a User Equipment, wherein the target information field indicates a slot offset between a Physical Downlink Shared Channel, PDSCH, and corresponding Hybrid Automatic Repeat request, HARQ, feedback used by a UE, and the method comprises:
    determining a set of values for the slot offset indicated by the target information field in DCI corresponding to only a first DCI format configured by a network side, wherein the set of values corresponding to only the first DCI format is acquired based on a Radio Resource Control, RRC, message and comprises one value or more than one values; and
    acquiring a current value of the slot offset indicated by the target information field in DCI in a second DCI format, in response to receiving the DCI in the second DCI format sent by the network side, wherein another set of values for the slot offset indicated by the target information field in DCI corresponding to the second DCI format is specified by a protocol and comprises a plurality of values; wherein the current value of the slot offset indicated by the target information field in the DCI with the second DCI format is equal to one of the values of the set of values corresponding to only the first DCI format;
    wherein the first DCI format is a non-fallback DCI format and the second DCI format is a fallback DCI format.

7. The method according to claim 6, wherein, the method further comprises:
    performing the HARQ feedback to the network side based on the current value of the slot offset indicated by the target information field in the DCI with the second DCI format.

8. A user equipment, comprising at least a processor and a transceiver, wherein:
    the processor is configured to read programs in a memory to perform the method according to claim 6.

9. The user equipment according to claim 8, wherein, the processor is further configured to:
    perform the HARQ feedback to the network side based on the current value of the slot offset indicated by the target information field in the DCI with the second DCI format.

10. A network side device, comprising at least a processor and a transceiver, wherein:
    the processor is configured to read programs in a memory to perform the process of a method for determining a value of a target information field in Downlink Control Information, DCI, wherein the target information field indicates a slot offset between a Physical Downlink Shared Channel, PDSCH, and corresponding Hybrid Automatic Repeat request, HARQ, feedback used by a User Equipment, UE, and the method comprises:

notifying, through a Radio Resource Control, RRC, message, the UE of a set of values for the slot offset indicated by the target information field in DCI corresponding to a first DCI format for the UE, wherein the set of values corresponding to only the first DCI format comprises one value or more than one values, while another set of values for the slot offset indicated by the target information field in DCI corresponding to a second DCI format is specified by a protocol and comprises a plurality of values; and after determining to send DCI in the second DCI format to the UE, setting a current value of the slot offset indicated by the target information field in the DCI with the second DCI format to be equal to one of the values of the set of values corresponding to only the first DCI format;

wherein the first DCI format is a non-fallback DCI format and the second DCI format is a fallback DCI format;

the transceiver is configured to receive and send data under control of the processor.

11. The network side device according to claim 10, wherein, when setting a current value of the slot offset indicated by the target information field in the DCI with the second DCI format based on the set of values corresponding to only the first DCI format, the processor is configured to:

select, from the set of values corresponding to only the first DCI format, a value as the current value of the slot offset indicated by the target information field in the DCI with the second DCI format.

12. The network side device according to claim 10, wherein, after setting the current value of the slot offset indicated by the target information field in the DCI with the second DCI format, the processor is further configured to:

send the DCI in the second DCI format to the UE, and trigger the UE to perform the HARQ feedback to the network side based on the current value of the slot offset indicated by the target information field in the DCI with the second DCI format.

* * * * *